United States Patent
Vittur et al.

(10) Patent No.: US 11,248,748 B2
(45) Date of Patent: Feb. 15, 2022

(54) DRAG REDUCING AGENTS

(71) Applicants: Brandon M. Vittur, Sugar Land, TX (US); Jian Zou, Sugar Land, TX (US)

(72) Inventors: Brandon M. Vittur, Sugar Land, TX (US); Jian Zou, Sugar Land, TX (US)

(73) Assignee: BAKER HUGHES OILFIELD OPERATIONS LLC, Houston, TX (US)

(*) Notice: Subject to any disclaimer, the term of this patent is extended or adjusted under 35 U.S.C. 154(b) by 0 days.

(21) Appl. No.: 16/892,834

(22) Filed: Jun. 4, 2020

(65) Prior Publication Data
US 2020/0392425 A1 Dec. 17, 2020

Related U.S. Application Data

(60) Provisional application No. 62/861,598, filed on Jun. 14, 2019.

(51) Int. Cl.
*F17D 1/17* (2006.01)
*C10L 1/16* (2006.01)
(Continued)

(52) U.S. Cl.
CPC ........... *F17D 1/17* (2013.01); *C08L 25/06* (2013.01); *C08L 33/08* (2013.01); *C10G 71/00* (2013.01);
(Continued)

(58) Field of Classification Search
CPC ...... C08L 25/06; C08L 33/08; C08L 2207/53; C09K 2208/28; C10G 71/00; C10G 2400/10; C10L 1/1641; C10L 1/165; C10L 1/1963; C10L 1/1973; C10L 2250/04; C10M 101/025; C10M 143/00; C10M 169/02; C10M 177/00; C10M 2201/02; C10M 2203/003; C10M 2205/02; C10M 2205/022; C10M 2205/183;
(Continued)

(56) References Cited

U.S. PATENT DOCUMENTS

| 4,340,076 A | 7/1982 | Weitzen |
| 4,518,757 A | 5/1985 | Schulz et al. |

(Continued)

FOREIGN PATENT DOCUMENTS

| CA | 2247100 C | 7/2007 |
| CN | 2603034 Y | 2/2004 |

(Continued)

OTHER PUBLICATIONS

Hartmann et al. "Water-Soluble Firls for Agrochemicals", Dec. 31, 2014; 4 pages, with English abstract.
(Continued)

*Primary Examiner* — James C Goloboy
(74) *Attorney, Agent, or Firm* — Cantor Colburn LLP

(57) ABSTRACT

A drag reducing composition comprises a sealed temporary container; and a drag reducing agent and up to 20 weight percent of a dispersing fluid disposed in the sealed temporary container. The drag reducing agent comprises polyolefin particles having a particle size of about 10 to about 2,000 microns; and the dispersing fluid comprising water, an alcohol, a hydrocarbon, or a combination comprising at least one of the foregoing.

22 Claims, 3 Drawing Sheets

(51) Int. Cl.
*C10L 1/197* (2006.01)
*C08L 25/06* (2006.01)
*C08L 33/08* (2006.01)
*C10L 1/196* (2006.01)
*C10G 71/00* (2006.01)
*C10M 101/02* (2006.01)
*C10M 169/02* (2006.01)
*C10M 177/00* (2006.01)
*C10N 50/00* (2006.01)
*C10N 70/00* (2006.01)

(52) U.S. Cl.
CPC .............. *C10L 1/165* (2013.01); *C10L 1/1641* (2013.01); *C10L 1/1963* (2013.01); *C10L 1/1973* (2013.01); *C10M 101/025* (2013.01); *C10M 169/02* (2013.01); *C10M 177/00* (2013.01); C08L 2207/53 (2013.01); C09K 2208/28 (2013.01); C10G 2400/10 (2013.01); C10L 2250/04 (2013.01); C10M 2201/02 (2013.01); C10M 2203/003 (2013.01); C10M 2205/022 (2013.01); C10M 2205/183 (2013.01); C10N 2050/12 (2020.05); C10N 2070/00 (2013.01)

(58) Field of Classification Search
CPC ....... C10M 2207/0215; C10N 2010/06; C10N 2020/04; C10N 2030/06; C10N 2050/12; C10N 2070/00; F17D 1/17
See application file for complete search history.

(56) References Cited

U.S. PATENT DOCUMENTS

| | | | |
|---|---|---|---|
| 4,720,397 A | 1/1988 | O'Mara et al. | |
| 5,126,070 A | 6/1992 | Leifheit et al. | |
| 5,323,906 A | 6/1994 | Gouge et al. | |
| 5,341,932 A | 8/1994 | Chen et al. | |
| 5,449,732 A | 9/1995 | Smith et al. | |
| 5,504,132 A | 4/1996 | Smith et al. | |
| 6,126,872 A * | 10/2000 | Kommareddi | B01J 13/02 264/4.1 |
| 6,160,036 A | 12/2000 | Kommareddi et al. | |
| 6,172,151 B1 * | 1/2001 | Johnston | F17D 1/16 524/379 |
| 6,649,670 B1 * | 11/2003 | Harris | C08F 2/002 523/175 |
| 6,841,593 B2 | 1/2005 | Kommareddi et al. | |
| 6,946,500 B2 | 9/2005 | Harris et al. | |
| 7,119,132 B2 | 10/2006 | Harris et al. | |
| 7,592,379 B2 | 9/2009 | Liu et al. | |
| 9,074,024 B2 | 7/2015 | Nesyn et al. | |
| 2002/0065352 A1 | 5/2002 | Johnston et al. | |
| 2003/0013783 A1 | 1/2003 | Kommareddi et al. | |
| 2004/0132883 A1 | 7/2004 | Harris et al. | |
| 2006/0293196 A1 * | 12/2006 | Harris | C10L 1/10 508/591 |
| 2007/0177454 A1 * | 8/2007 | Hyatt | B01F 3/04106 366/136 |
| 2008/0064785 A1 | 3/2008 | Martin et al. | |
| 2011/0319520 A1 | 12/2011 | Mathew et al. | |
| 2014/0238889 A1 | 8/2014 | Sunder et al. | |
| 2014/0356603 A1 | 12/2014 | Kumar et al. | |
| 2017/0156999 A1 | 6/2017 | Harris et al. | |
| 2019/0382511 A1 * | 12/2019 | Zou | C08F 2/01 |

FOREIGN PATENT DOCUMENTS

| | | |
|---|---|---|
| CN | 104214515 A | 12/2014 |
| CN | 107325379 A | 11/2017 |
| DE | 4244729 A1 | 5/1994 |
| EP | 1358231 A2 | 11/2003 |
| EP | 1578804 A1 | 9/2005 |
| JP | 0240254 A | 2/1990 |
| WO | 2015048411 A1 | 4/2015 |
| WO | 2017189322 A1 | 11/2017 |
| WO | 2017216827 A1 | 12/2017 |

OTHER PUBLICATIONS

International Search Report for International Application No. PCT/US2020/036955, International Filing Date Jun. 10, 2020, dated Sep. 23, 2020, 3 pages.
M. A. Kelland, "Production Chemicals for the Oil and Gas Industry", 2nd edition, CRC Press, 2014, pp. 375-383.
Oberlerchner et al., "Overview of Methods for the Direct Molar Mass Determination of Cellulose"; Molecules 2015; 20, 10313-10341; www.mdpi.com/journal/molecules; 29 pages.
Written Opinion for International Application No. PCT/US2020/036955, International Filing Date Jun. 10, 2020, dated Sep. 23, 2020, 6 pages.
Yacob et al., "Determination of Viscosity-Average Molecular Weight of Chitosan Using Intrinsic Viscosity Measurement"; Malaysian Nuclear Agency, Bangi, 4 pages.

* cited by examiner

DRAG REDUCING AGENTS

CROSS REFERENCE TO RELATED APPLICATION

This application claims priority to U.S. Provisional Application No. 62/861,598, filed on Jun. 14, 2019, the content of which is incorporated hereby by reference in its entirety.

BACKGROUND

Drag reducing agents (DRAs) have been used to reduce the drag of hydrocarbon fluids such as crude oil and refined products flowing through a conduit such as a pipeline, and hence the energy required to transport such fluids. DRAs can also increase the flow capacity of existing pipelines.

Ultrahigh molecular weight, non-crystalline polyalphaolefins are known drag reducing agents for hydrocarbons. These drag reducing agents are typically ground at the manufacturing facilities and then dispersed in a dispersing fluid before being transported to injection sites, where DRAs are used. Slurries of ground DRA particulates are stable and can be easily pumped and injected into hydrocarbons. However, transportation of dispersing fluids increases the shipping costs, which does not directly add to or improve drag reduction performance of DRA. Accordingly, there is a need in the art for drag reducing agents that can be conveniently and economically manufactured, stored, transported, and applied with high polyalpha-olefin concentrations. It would be a further advantage if the drag reducing agents could have a long shelf life under a wide range of storage temperatures.

BRIEF DESCRIPTION

A drag reducing composition comprises: a sealed temporary container; and a drag reducing agent and up to 20 weight percent of a dispersing fluid in the sealed temporary container; wherein the drag reducing agent comprises polyolefin particles having a particle size of about 10 to about 2,000 microns; the dispersing fluid comprising water, an alcohol, a hydrocarbon, or a combination comprising at least one of the foregoing; the temporary container comprises a container material, which includes a polyethylene, a polypropylene, an ethylene propylene copolymer, a polystyrene, a polylactic acid, a polyamide, a polyester, a polystyrene, an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene oxide, a polyethylene glycol, polyvinylidene chloride, a polysaccharide or its derivative, or a combination comprising at least one of the foregoing; and the weight percent is based on the total weight of the drag reducing composition.

A method of reducing the flow resistance of a fluid comprises disposing the above described drag reducing composition in the fluid; and removing the temporary container.

A process of manufacturing the above described drag reducing composition comprises disposing the drag reducing agent in the temporary container; and sealing the temporary container.

BRIEF DESCRIPTION OF THE DRAWINGS

The following descriptions should not be considered limiting in any way. With reference to the accompanying drawings, like elements are numbered alike.

DETAILED DESCRIPTION

Applicants have found drag reducing compositions that can be conveniently and economically manufactured, stored, shipped, and applied. These drag reducing compositions contain a drag reducing agent disposed in a sealed temporary container with or without other compartments. With the protection of the temporary container, the drag reducing agents can be transported and stored without agglomeration issues associated with typical micron-sized ground drag reducing agent particulates. The discovery allows the manufacturers to transport drag reducing agents without any dispersing fluid or with reduced amount of dispersing fluids, thus significantly reducing the shipping cost of DRA products. In addition, potential hazards associated with transferring powders and certain dispersing fluids can be reduced.

Moreover, the drag reducing compositions according to the disclosure can have consistent drag reducing performance. For example, without wishing to be bound by theory, it is believed that when DRA particles with different sizes are mixed in a drum or a super sack, the particles with smaller sizes may settle down near the bottom of the drum or the super sack, while the particles with larger sizes may settle near the top of the drum or the super sack. The non-uniform distribution of the DRA particles can lead to inconsistent drag reducing performance as smaller particles tend to dissolve faster thus providing quicker drag reducing effect as compared to larger particles. In contrast, the drag reducing agents according to the disclosure can have consistent compositions thus providing consistent drag reducing performance.

Further, the drag reducing compositions according to the disclosure can be stable at a wide temperature range, for example from −60° C. to 60° C. Thus these drag reducing compositions can have a longer shelf life as compared to drag reducing agents without the temporary container. In addition, certain commercial DRA products on the market are not stable or freeze at −60° C. to 0° C. due to the freezing point of dispersing fluids, therefore, heating is required to use these products in a cold climate. In contrast, the drag reducing compositions according to the disclosure may be shipped, stored, or used over a wide temperature range without the need to heat the products or heat/insulate their delivery systems.

Once the drag reducing compositions are transported to a desired location such as an injection site, a pipeline location, or a warehouse, the drag reducing agents can be released from the sealed temporary container and used directly without any additional grinding.

Figure 1:
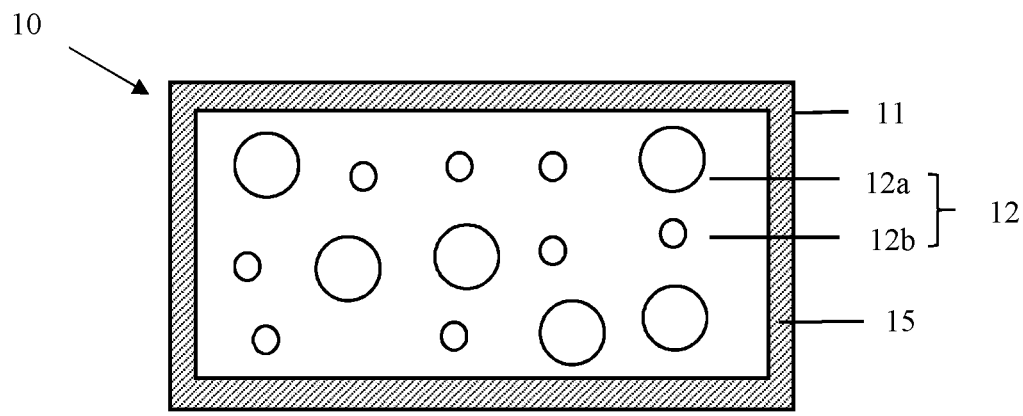
FIG. 1 illustrates a drag reducing composition including a drag reducing agent disposed in a sealed temporary container.
Figure 2:
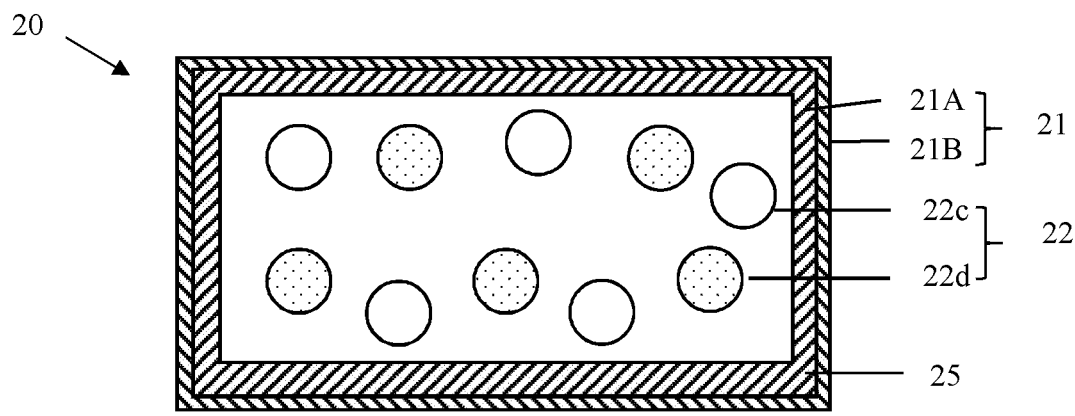
FIG. 2 illustrates a drag reducing composition including a drag reducing agent disposed in a sealed temporary container, wherein the temporary container has two layers.
Figure 3:
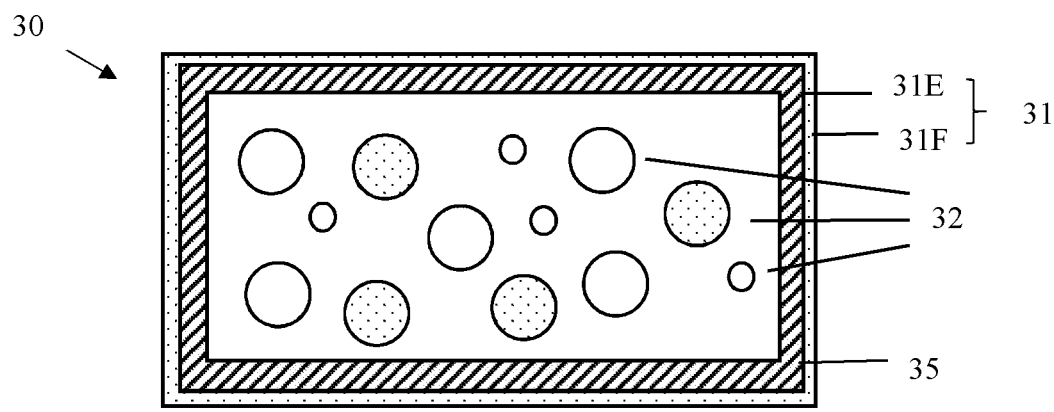
FIG. 3 illustrates a drag reducing composition including a drag reducing agent disposed in a sealed temporary container, wherein the temporary container has a coating.

FIGS. 1-3 illustrate drag reducing compositions (10, 20, 30) containing a drag reducing agent (12, 22, 32) disposed in a sealed temporary container (11, 21, 31).

The sealed temporary container comprises a container material (15, 25, 35). Suitable container materials are those that are dissolvable in water, hydrocarbon, and/or a solvent, and are capable of forming a film. Examples of container materials include a polyethylene, a polypropylene, an ethylene propylene copolymer, a polystyrene, a polylactic acid, a polyamide, a polyester, a polystyrene, an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene glycol, polyvinylidene chloride, a polysaccharide or its derivative, or a combination comprising at least one of the foregoing. Examples of polysaccharides and polysaccharide derivatives include chitin, chitosan, chemically modified cellulose, and a chemically modified starch. As used herein, chemically modified cellulose and chemically modified starch refer to cellulose or starch which have been chemically treated such that the modified material is dissolvable in a polar solvent, and is capable of forming a film. Examples of chemically modified starch include starch acetate. Examples of chemically modified cellulose include cellulose acetate and cellulose triacetate. Polyethylene glycol is also known as polyethylene oxide (PEO) or polyoxyethylene (POE). As used herein, polyethylene glycol can have a molecular weight of more than 8,000,000 Daltons. More than one container materials can be used. In an embodiment the container material comprise an ethylene vinyl alcohol copolymer. The ethylene vinyl alcohol copolymer can contain about 5 to about 95 mol % of the units derived from ethylene, and about 95 to about 5 mol % of units derived from vinyl alcohol.

The sealed temporary container can have a single layered structure or a multi-layered structure. A single layered structure means that the temporary container has only one layer, and that layer is made from the container material as disclosed herein. A multi-layered structure means that the temporary container has two or more layers, wherein at least one layer is made from the container material as disclosed herein. Without wishing to be bound by theory, it is believed that when the temporary container is constructed with multiple layers of different materials, the dissolution of the container material can be fine-tuned.

Co-extrusion or other methods known in the art can be used to produce temporary containers having a multi-layered structure. In a temporary container having a multi-layered structure, the layer that faces the polyolefin core is referred to as an inner layer (21A), and the layer defines the exterior of the temporary container is referred to as an outer layer (21B). The layer that includes the container material as disclosed herein can be an inner layer or an outer layer of the temporary container. In an embodiment, each layer of the multi-layer structure independently comprises a container material as disclosed herein.

Optionally the temporary container can be coated with wax, a silicone, or a combination comprising at least one of the foregoing to form a coating. The wax can be a natural wax or a synthetic wax. Examples of suitable naturally occurring wax materials include beeswax, candelilla wax, carnauba wax, ozokerite wax, ceresine wax, montan wax. Synthetic waxes include paraffin waxes, and polymers under the tradenames VYBAR™ and POLYWAX™ from Baker Hughes. As used herein, silicone includes silicone oils. In an embodiment, the silicone in the coating is polydimethylsiloxane (PDMS).

The coating (31F) can be disposed on an inner surface of the temporary container, an outer surface of the temporary container, or both the inner surface and the outer surface of the temporary container. As used herein, an inner surface of the temporary container means the surface that would otherwise be in direct physical contact with the drag reducing agents when the coating is not present. The outer surface (31E) refers to a surface that is opposed to the inner surface. The coating material can be sprayed onto the inner and/or outer surfaces of the temporary container in situ during a continuous process to manufacture the drag reducing compositions.

Figure 4:
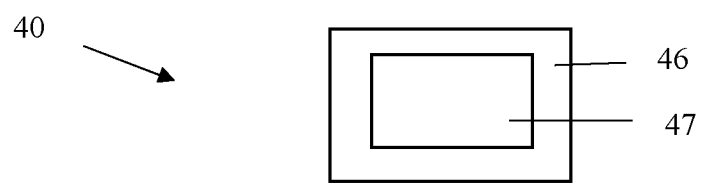
FIG. 4 illustrates a drag reducing composition including a drag reducing agent encapsulated in a temporary container or a sealed pouch disposed inside the temporary container.

The drag reducing compositions can include one or multiple individually sealed temporary containers. As illustrated in FIG. 4, the drag reducing compositions (400) can include a sealed temporary container (46) and a sealed pouch (47) disposed in the sealed temporary container (46). In an embodiment, a drag reducing agent is encapsulated in the sealed pouch, and a different drag reducing agent is disposed between the sealed pouch and the sealed temporary container. The differences between the drag reducing agents include particle size distribution, polymer morphology, molecular weight distribution, weight average molecular weight, monomers/oligomers used to make the drag reducing agents, or a combination thereof.

Figure 5:
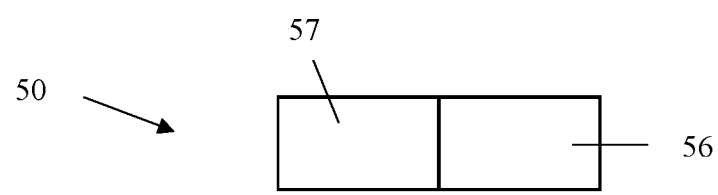
FIG. 5 illustrates a drag reducing composition including a drag reducing agent disposed in at least one of a plurality of connected but individually sealed temporary containers.
Figure 6:
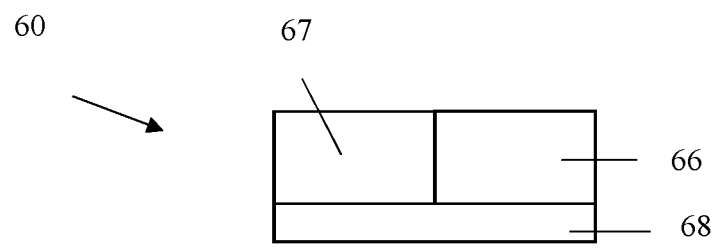
FIG. 6 illustrates a drag reducing composition including a drag reducing agent disposed in at least one of the three connected but individually sealed containers.

FIGS. 5 and 6 illustrate drag reducing compositions (500, 600) having a drag reducing agent encapsulated in at least one of a plurality of connected but individually sealed temporary containers (56, 57, 66, 67, 68). The individually sealed temporary containers can form a chain having a length of greater than or equal to one meter, preferably 20 meters to 1000 meters in length for the convenience of transportation.

The individually sealed temporary container may have different shapes such as a sphere, a cylinder, a rectangular cuboid, a cube, and an irregular shape. The largest dimension of each sealed temporary container is about 0.5 cm to about 100 cm, preferably about 2 cm to about 30 cm, more preferably about 2 cm to about 5 cm or about 5 cm to about 20 cm.

The temporary container can have a wall thickness of about 1 to about 1,000 microns, preferably about 1 micron to about 100 microns or about 10 to about 100 microns.

The drag reducing compositions include a drag reducing agent encapsulated in the sealed temporary container. The drag reducing agents include a plurality of polyolefin particles. The polyolefin particles can have a particle size of about 10 to about 2,000 microns, about 50 to about 2,000 microns, about 50 to about 1,500 microns, about 75 to about 1,000 microns, or about 75 to about 750 microns. Polyolefin particles of different average particle size may be used, and in this way, the particle size distribution of the polyolefin particles may be unimodal (exhibiting a single distribution), bimodal (exhibiting two distributions), or multi-modal (exhibiting more than one particle size distribution).

The drag reducing agent can contain a plurality of first polyolefin particles (12a, 22c) and a plurality of second polyolefin particles (12b, 22d) different from the first polyolefin particles. The differences between the first polyolefin particles and the second polyolefin particles include particle size distribution, polymer morphology, molecular weight distribution, weight average molecular weight, monomers/oligomers used to make the polyolefin, or a combination thereof. The differences can be achieved by varying the starting material including monomers and catalysts, the polymerization methods, grinding time, grinding process, and the alike. In an embodiment, the first and second polyolefin particles are selected such that they have a synergistic effect on the drag reducing performance.

As a specific example, the drag reducing agents comprise about 2 to about 90 wt % of first polyolefin particles with a particle size of about 10 to about 200 microns and about 98 to about 10 wt % of second polyolefin particles with a particle size about 200 to about 1,000 microns, based on the total weight of the drag reducing agents disposed in the sealed temporary container.

The drag reducing agents can have a weight average molecular weight of greater than or equal to about 1,000,000 Daltons, for example, about 10,000,000 to about 30,000,000 Daltons. Such drag reducing agents are also referred as polyolefins having ultrahigh weight average molecular weight. The weight average molecular weight of the polyolefin particles is estimated by the inherent viscosity. Methods of estimating the weight average molecular weight with inherency viscosity are known and have been described in U.S. Pat. No. 5,449,732, and Production Chemicals for the Oil and Gas Industry ($2^{nd}$ Edition) by Malcolm A. Kelland.

The drag reducing agents comprise a polyolefin homopolymer, a copolyolefin, a polyolefin copolymer, or a combination comprising at least one of the foregoing. The drag reducing agents can be formed from at least one olefin monomer, or at least one olefin oligomer, or a combination thereof. The olefin monomers can be alpha olefin monomers having a structure represented by Formula (I):

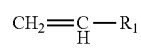

Formula (I)

wherein $R_1$ is a $C_{2-25}$ or $C_{4-20}$ alkyl group. Examples of the alpha olefin monomers include, but are not limited to, hexene, octene, decene, and tetradecene, or a combination comprising at least one of the foregoing. Olefin oligomers include oligomers derived from olefin monomers and can have a weight average molecular weight of less than about 5,000 Daltons or less than about 3,000 Daltons as determined by a gel permeation chromatography (GPC) method.

As used herein, the drag reducing agents can include polyolefin copolymers. The copolymers can be derived from at least one olefin monomer, at least one olefin oligomer, or a combination thereof and at least one of styrene, a vinyl acetate, a vinylalkylene carboxylic ester having the Formula (II), an oligomer thereof, or a combination thereof:

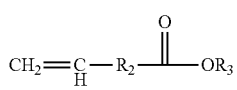

Formula (II)

wherein $R_2$ and $R_3$ are each independently a $C_{1-25}$ alkyl. The oligomer can have a weight average molecular weight of less than about 5,000 Daltons or less than about 3,000 Daltons as determined by a gel permeation chromatography (GPC) method. Thus the polyolefins can be a copolymer comprising units derived from olefin monomers of formula (I), and/or olefin oligomer thereof, as well as units derived from at least one styrene, a vinylalkylene carboxylic ester having the Formula (II), an oligomer thereof, or a combination thereof.

The polyolefin copolymer has a chemical structure of Formula (III) or Formula (IV) with x ranging from about 50,000 to about 20,000,000 and y ranging from about 50,000 to about 20,000,000, $R_1$ is as defined in Formula (I), $R_2$ and $R_3$ are each independently a $C_{1-25}$ alkyl, and each $R_4$ is independently a phenyl group or an acetate group (—OC(=O)CH$_3$). The ratio of y to x can be from about 0.0001 to about 0.99, preferably from about 0.0001 to 0.2:

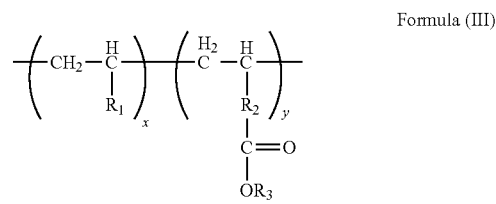

Formula (III)

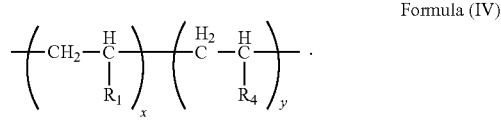

Formula (IV)

The polyolefins can be synthetized via a bulk polymerization, a solution polymerization, an emulsion polymerization, a precipitation process, or other polymerization processes known to a person skilled in the art.

Polymerization catalysts that can be used include Ziegler-Natta catalysts as described in U.S. Pat. No. 6,649,670. Exemplary catalysts include, but are not necessarily limited to, aluminum activated titanium trichloride (TiCl$_3$AA), diethylaluminum chloride (DEAC), diethylaluminum ethoxide (DEALE), triethyl aluminum chloride (TEAL), trimethyl aluminum, tri-isobutyl aluminum, methylaluminoxane (MAO) and the like. Other catalysts or co-catalysts known in the art can also be used. If a catalyst is used in the bulk polymerization, optionally, the catalyst can be deactivated in a blender by exposing the polymerization products to water, air, or a combination thereof.

If needed, the formed solid polyolefin drag reducing agents are broken into smaller pieces for ease of handling and fast dissolving in the target hydrocarbon fluids. Known grinding methods such as non-cryogenic grinding and cryogenic grinding can be used.

In a non-cryogenic grinding process, solid polyolefin and anti-agglomeration agent can be dispersed in a dispersing fluid. The dispersion can be fed into a grinding chamber where the solid polyolefin drag reducing agents are ground at a non-cryogenic temperature. Solid and liquid grinding aids, such as those described in U.S. Pat. No. 6,946,500, and the above mentioned anti-agglomeration agents can be used. As used herein, a cryogenic temperature refers to the glass transition temperature (Tg) of the particular drag reducing agents being ground, or below that temperature. A non-cryogenic temperature refers to a temperature that is above the cryogenic temperature for the particular drag reducing agents being ground. The ground polyolefin particles can be dried by a drying technique to remove the dispersing fluid thereby forming a plurality of drag reducing agent particles.

To carry out cryogenic grinding, it is not necessary to form a dispersion first. Rather, the solid drag reducing agents manufactured via a bulk polymerization or a solution polymerization process are ground in the presence of anti-agglomeration agents as described herein at a cryogenic temperature to form polyolefin particles.

Optionally, the drag reducing agents are free-flowing. The meaning of the term "free-flowing" is known to those skilled in the art and is used to describe particulate materials that can be poured without substantial clumping of the particles. As used herein, the phrase "free-flowing polyolefin particles" refers to solid polyolefin drag reducing agent particles that are not sticky, and thus have no or hardly any tendency to agglomerate or to adhere to contact surfaces.

The sealed temporary container can also contain up to 20 wt % or up to 10 wt % or up to 5 wt % of a dispersing fluid together with the drag reducing agents, based on the total weight of the drag reducing compositions. As used herein, a dispersing fluid refers to any liquid or any mixture of liquids that does not dissolve the drag reducing agents. Exemplary dispersing fluids include water, alcohols, and hydrocarbon or a combination comprising at least one of the foregoing. Exemplary dispersing fluid alcohols include methanol, ethanol, propanol, butanol, pentanol, hexanol, glycerol, ethylene glycol, propylene glycol, diethylene glycol, dipropylene glycol, or a methyl ether of a glycol, or a combination comprising at least one of the foregoing. Exemplary hydrocarbon include n-pentane, isopentane, hexane, heptane, or a combination comprising at least one of the foregoing. More than one dispersing fluid can be used.

Anti-agglomeration agents may be added into the temporary container to further prevent the agglomeration of the drag reducing agents during storage and transportation, and to improve the dissolving of DRA in the target hydrocarbon fluids.

Examples of anti-agglomeration agents include salts of fatty acids having 12 to 20 carbon atoms, specifically alkali earth metal salts of such acids, which may include, but are not limited to, magnesium stearate and calcium stearate, as well as polyethylene glycols polyethylene oxides with molecular weight 400 to 20,000,000 Daltons, methoxylated polyethylene glycols, linear primary alcohols having 12 to 60 carbon atoms (such as Baker Hughes UNILIN™ alcohols), polyethylene waxes with molecular weight 400 to 3000 Daltons (Baker Hughes POLYWAX™), polyacrylamides or chemically modified polyacrylamides with molecular weight 400 to 30,000,000 Daltons, linear primary alcohol ethoxylates with molecular weight 500 to 5000 Daltons (such as Baker Hughes UNITHOX™ ethoxylates), ethylene-bis-stearamide, inorganic clays such as attapulgite and silicones, or a combination comprising at least one of the foregoing.

A weight ratio of the drag reducing agents relative to the anti-agglomeration agents, if present, is about 99:1 to about 1:3 or about 5:1 to about 1:1. The anti-agglomeration agents can have a particle size of about 1 to about 2,000 microns, about 50 to about 2,000 microns, about 50 to about 1,500 microns, or about 75 to about 1000 microns. The particle sizes of the anti-agglomeration agents can be similar to or different from the particle sizes of the polyolefin particles.

In the drag reducing compositions, the drag reducing agent can be present in an amount of about 50 wt % to about 99.99 wt %, preferably about 80 wt % to 99.99 wt % or about 90 wt % to about 99.5 wt %, more preferably about 95 wt % to about 99.5 wt % or about 98 wt % to about 99.5 wt %, based on the total weight of the drag reducing compositions. The rest of the total weight of the drag reducing compositions is the weight of the dispersing fluids, if present, and the temporary containers.

The drag reducing agents can be injected into the temporary containers with or without additional anti-agglomeration agents, a dispersing fluid, or a combination comprising at least one of the foregoing. Once charged with the drag reducing agents and the optional anti-agglomeration agents and dispersing fluids, the temporary containers are sealed with methods known in the art. For example, the temporary containers can be sealed with heat, pressure, and/or adhesive.

Figure 7:
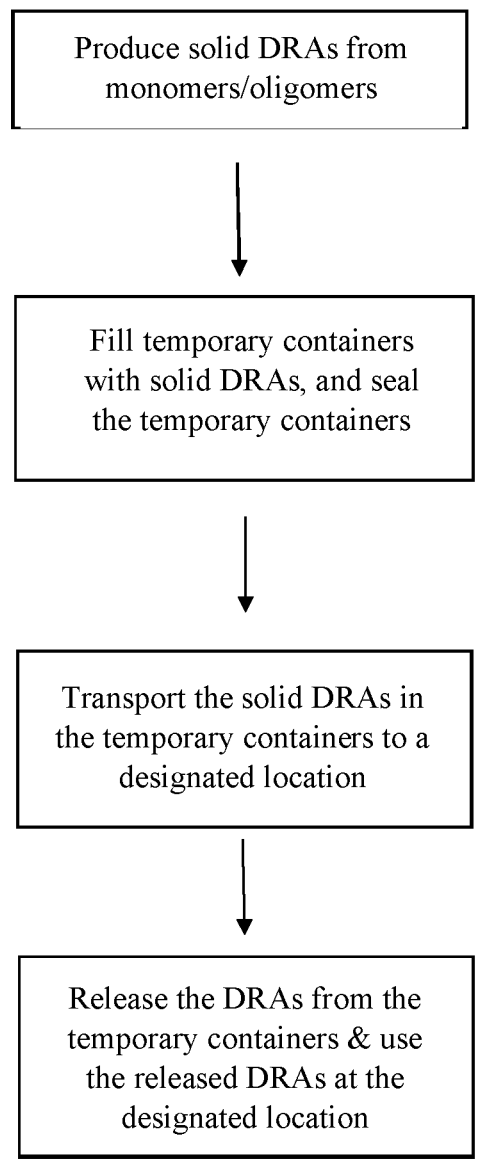
FIG. 7 is a diagram illustrating a process of making and using a drag reducing composition.

The drag reducing compositions can be transported to a desired location such as an injection site, a pipeline location, or a manufacturing facility close by, where the temporary containers can be either fully or partially removed by dissolving the container material in a polar solvent or crude oil. A process of making and using a drag reducing composition is illustrated in FIG. 7. Machines used to make the drag reducing compositions include commercially available vertical form, fill, and seal machines. To make drag reducing compositions having a sealed temporary container and a sealed pouch disposed in the sealed temporary container, two vertical form, fill, and seal machines can be used. To make drag reducing agents with multiple individually sealed temporary containers as illustrated in FIG. 5 and FIG. 6, commercially available thermoforming machines can be used.

The container material can be dissolved before the drag reducing agents are introduced into a hydrocarbon fluid, when the drag reducing agents are introduced into a hydrocarbon fluid, or after the drag reducing agents are introduced into a hydrocarbon fluid.

Advantageously, the polar solvent only selectively dissolves the container material but not the polyolefin drag reducing agents. Exemplary polar solvents include methanol, ethanol, propanol, hexanol, octanol, hexylene glycol, dimethylformamide, dimethyl sulfoxide, pyridine, and/or water, or a combination comprising at least one of the foregoing. Water can be in the form of steam. The polar solvent can also be mixed with the hydrocarbon such as crude oil and finished fuels. Crude oil may dissolve the temporary containers at ambient or elevated temperatures.

Optionally the container material is dissolved in the presence of an acid or base catalyst. Examples of acid catalysts include acetic acid, formic acid, p-toluenesulfonic acid, phenol, carbonic acid, $CO_2$, HCl, $H_2S$, $H_2SO_4$, $H_3PO_4$, or a combination comprising at least one of the foregoing. Examples of base catalysts include NaOH, KOH, $Na_2CO_3$, $K_2CO_3$, ammonia, amine such as ethylenediamine and ethanolamine, $NaHCO_3$, $KHCO_3$, or a combination comprising at least one of the foregoing. When an acid or base catalyst is used, the container material can be dissolved in a much faster rate and a lower temperature. If desired, a rinse process with alcohols such as methanol, ethanol, propanol, hexanol, octanol, hexylene glycol, and/or water or a neutralization process can be used to remove the residual acid/base catalysts after the container material is dissolved. Any neutralization process known to a person skilled in the art can be used. For example, one can use an acid to neutralize a base and use a base to neutralize an acid.

As used herein, dissolving the container material includes decomposing the container material and dissolving the decomposed material in the polar solvent as disclosed herein or in hydrocarbons that contain the polar solvent, for example, crude oils, and finished fuels such as gasoline and diesel. One of the exemplary decomposing processes includes hydrolyzing the container material in water. Dissolving the container material also includes the embodiments where the container material is dissolved without degradation.

The temperature of the polar solvent used to dissolve the container material is not particularly limited, and can be about −100° C. to about 200° C. or about −20° C. to about 60° C.

The drag reducing compositions can be applied to hydrocarbons downhole using a conveyor belt, a screw convey/feeder, a pneumatic transfer system, or the like. When the drag reducing compositions including seal temporary containers of a relatively small size, compressed air or nitrogen can also be used to inject the drag reducing compositions into a pipeline.

Example 1

Drag reducing agents having a core containing free-flowing polyolefin particles with different particle size distributions are provided. The drag reducing agents have a low density polyethylene container and a core containing 20-60 wt % of ultrahigh molecular weight polyolefin particles with a particle size of 50-200 microns and 80-40 wt % of ultrahigh molecular weight polyolefin particles with a particle size of 200-1,000 microns. The ultrahigh molecular weight polyolefin is made from a bulk polymerization process using a Ziegler-Natta catalyst. After the polymerization, the polymer is ground with a polyethylene waxes with molecular weight 400 to 3000 Daltons under cryogenic grinding conditions. About 20-60 wt % of the polymer is ground for a longer period of time thus producing particles having a particle size of about 50 to 200 microns. About 80-40% of the polymer is ground for a shorter period of time, thus producing particles having a particle size of around 200 to 1,000 microns.

Example 2

Drag reducing agents having a core containing free-flowing polyolefin particles with different weight average molecular weights are provided. The drag reducing agents have a low density polyethylene container and a core containing free-flowing ultrahigh molecular weight polyolefin particles made from a bulk polymerization process and ultrahigh molecular weight polyolefin particles made from a precipitation polymerization process. The ultrahigh molecular weight polyolefin made from a bulk polymerization process is ground with a polyethylene waxes with molecular weight 400 to 3000 Daltons under cryogenic grinding conditions. The polyolefin made from bulk polymerization process has a higher molecular weight than the polyolefin made from the precipitation polymerization process. The free-flowing polyolefin particles have a size of about 100 to about 1,000 microns.

Set forth below are various embodiments of the disclosure.

Embodiment 1

A drag reducing composition comprising: a sealed temporary container; and a drag reducing agent and up to 20 weight percent of a dispersing fluid disposed in the sealed temporary container; wherein the drag reducing agent comprises polyolefin particles having a particle size of about 10 to about 2,000 microns; the dispersing fluid comprising water, an alcohol, hydrocarbon, or a combination comprising at least one of the foregoing; the temporary container comprises a container material, which includes a polyethylene, a polypropylene, an ethylene propylene copolymer, a polystyrene, a polylactic acid, a polyamide, a polyester, a polystyrene, an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene oxide, a polyethylene glycol, polyvinylidene chloride, a polysaccharide or its derivative, or a combination comprising at least one of the foregoing; and the weight percent is based on the total weight of the drag reducing composition.

Embodiment 2

The drag reducing composition as in any prior embodiment, wherein the drag reducing agent comprises a plurality of first polyolefin particles; and a plurality of second polyolefin particles different from the first polyolefin particles.

Embodiment 3

The drag reducing composition as in any prior embodiment, wherein the first polyolefin particles have a particle size of about 10 to about 200 microns and the second polyolefin particles have a particle size of about 200 to about 2,000 microns.

Embodiment 4

The drag reducing composition as in any prior embodiment, wherein the first polyolefin particles have a weight average molecular weight of about 50,000 to about 20,000,000 and the second polyolefin particles have a weight average molecular weight of about 1,000,000 to more than 30,000,000.

Embodiment 5

The drag reducing composition as in any prior embodiment, further comprising an anti-agglomeration agent disposed in the sealed temporary container, wherein the anti-agglomeration agent comprises a salt of fatty acids having 12-20 carbon atoms, a polyethylene glycol or a polyethylene oxide with molecular weight 400 to 20,000,000 Daltons, a methoxylated polyethylene glycol, a polyacrylamide or a chemically modified polyacrylamide with molecular weight 400 to 30,000,000 Daltons, a linear primary alcohol having 12 to 60 carbon atoms, a polyethylene wax with molecular weight 400 to 3000 Daltons, a linear primary alcohol ethoxylate with molecular weight 500 to 5000 Daltons, ethylene-bis-stearamide, an inorganic clay, a silicone, or a combination comprising at least one of the foregoing.

Embodiment 6

The drag reducing composition as in any prior embodiment, wherein the temporary container has two or more layers, and at least one layer comprises the container material.

Embodiment 7

The drag reducing composition as in any prior embodiment, wherein each of the two or more layers independently comprises the container material.

Embodiment 8

The drag reducing composition as in any prior embodiment, wherein the temporary container has an inner surface and an opposing outer surface, and a coating is disposed on at least one of the inner and outer surfaces of the temporary container, the coating comprising a wax, a silicone, or a combination comprising at least one of the foregoing.

Embodiment 9

The drag reducing composition as in any prior embodiment, wherein the temporary container has a thickness of about 1 to about 1,000 microns.

Embodiment 10

The drag reducing composition as in any prior embodiment, further comprising a sealed pouch disposed inside the sealed temporary container.

Embodiment 11

The drag reducing composition as in any prior embodiment, comprising a plurality of the sealed temporary container, wherein adjacent sealed temporary containers are connected, and the drag reducing agent is disposed in at least one of the plurality of the sealed temporary containers.

Embodiment 12

The drag reducing composition as in any prior embodiment, wherein the plurality of the temporary containers form a chain having a length of greater than about 1 meter.

Embodiment 13

The drag reducing composition as in any prior embodiment, wherein the polyolefin particles comprise a polyolefin homopolymer, a copolyolefin, a polyolefin copolymer, or a combination comprising at least one of the foregoing, and the polyolefin copolymer comprises first units derived from an olefin component and second units derived from styrene, a vinyl acetate, a vinylalkylene carboxylic ester, or a combination comprising at least one of the foregoing.

Embodiment 14

The drag reducing composition as in any prior embodiment, wherein the drag reducing agent is present in an amount of about 80 wt % to about 99.99 wt %, based on the total weight of the drag reducing composition.

Embodiment 15

A fluid comprising the drag reducing composition as in any prior embodiment.

Embodiment 16

The fluid as in any prior embodiment, wherein the fluid further comprises water, a hydrocarbon, or a combination comprising at least one of the foregoing.

Embodiment 17

A process of manufacturing the drag reducing composition as in any prior embodiment, the process comprising: disposing the drag reducing agent and up to 20 weight percent of the dispersing fluid in the temporary container; and sealing the temporary container.

Embodiment 18

A method of reducing the flow resistance of a fluid, the method comprising: disposing the drag reducing composition as in any prior embodiment in the fluid; and removing the temporary container.

Embodiment 19

The method as in any prior embodiment, wherein removing the temporary container comprises dissolving the container material with a polar solvent, a hydrocarbon, or a combination comprising at least one of the foregoing.

Embodiment 20

The method as in any prior embodiment, wherein the temporary container is removed in the presence of an acid or base catalyst.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A drag reducing composition comprising:
   a sealed temporary container; and
   a drag reducing agent and up to 20 weight percent of a dispersing fluid disposed in the sealed temporary container;
   wherein the drag reducing agent comprises polyolefin particles having a particle size of about 10 to about 2,000 microns;
   the dispersing fluid comprises water, an alcohol, a hydrocarbon, or a combination comprising at least one of the foregoing;
   the temporary container comprises a container material, which includes a polyethylene, a polypropylene, an ethylene propylene copolymer, a polystyrene, a polylactic acid, a polyamide, a polyester, a polystyrene, an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene oxide, a polyethylene glycol, polyvinylidene chloride, a polysaccharide or its derivative, or a combination comprising at least one of the foregoing; and
   the weight percent is based on the total weight of the drag reducing composition, and
   wherein the temporary container has a thickness of about 1 to about 1,000 microns.

2. The drag reducing composition of claim 1, wherein the drag reducing agent comprises a plurality of first polyolefin particles; and a plurality of second polyolefin particles different from the first polyolefin particles.

3. The drag reducing composition of claim 2, wherein the first polyolefin particles have a particle size of about 10 to about 200 microns and the second polyolefin particles have a particle size of about 200 to about 2,000 microns.

4. The drag reducing composition of claim 2, wherein the first polyolefin particles have a weight average molecular weight of about 50,000 to about 20,000,000 and the second polyolefin particles have a weight average molecular weight of about 1,000,000 to more than 30,000,000.

5. The drag reducing composition of claim 1, further comprising an anti-agglomeration agent disposed in the sealed temporary container, wherein the anti-agglomeration agent comprises a salt of fatty acids having 12-20 carbon atoms, a polyethylene glycol or a polyethylene oxide with molecular weight 400 to 20,000,000 Daltons, a methoxylated polyethylene glycol, a polyacrylamide or a chemically modified polyacrylamide with molecular weight 400 to 30,000,000 Daltons, a linear primary alcohol having 12 to 60 carbon atoms, a polyethylene wax with molecular weight 400 to 3000 Daltons, a linear primary alcohol ethoxylate with molecular weight 500 to 5000 Daltons, ethylene-bis-stearamide, an inorganic clay, a silicone, or a combination comprising at least one of the foregoing.

6. A drag reducing composition comprising:
a sealed temporary container; and
a drag reducing agent and up to 20 weight percent of a dispersing fluid disposed in the sealed temporary container;
wherein the drag reducing agent comprises polyolefin particles having a particle size of about 10 to about 2,000 microns;
the dispersing fluid comprises water, an alcohol, a hydrocarbon, or a combination comprising at least one of the foregoing;
the temporary container comprises a container material, which includes a polyethylene, a polypropylene, an ethylene propylene copolymer, a polystyrene, a polylactic acid, a polyamide, a polyester, a polystyrene, an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene oxide, a polyethylene glycol, polyvinylidene chloride, a polysaccharide or its derivative, or a combination comprising at least one of the foregoing; and
the weight percent is based on the total weight of the drag reducing composition, and
wherein the temporary container has two or more layers, and at least one layer comprises the container material.

7. The drag reducing composition of claim 6, wherein each of the two or more layers independently comprises the container material.

8. A drag reducing composition comprising:
a sealed temporary container; and
a drag reducing agent and up to 20 weight percent of a dispersing fluid disposed in the sealed temporary container;
wherein the drag reducing agent comprises polyolefin particles having a particle size of about 10 to about 2,000 microns;
the dispersing fluid comprises water, an alcohol, a hydrocarbon, or a combination comprising at least one of the foregoing;
the temporary container comprises a container material, which includes a polyethylene, a polypropylene, an ethylene propylene copolymer, a polystyrene, a polylactic acid, a polyamide, a polyester, a polystyrene, an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene oxide, a polyethylene glycol, polyvinylidene chloride, a polysaccharide or its derivative, or a combination comprising at least one of the foregoing; and
the weight percent is based on the total weight of the drag reducing composition; and
wherein the temporary container has an inner surface and an opposing outer surface, and a coating is disposed on at least one of the inner and outer surfaces of the temporary container, the coating comprising a wax, a silicone, or a combination comprising at least one of the foregoing.

9. The drag reducing composition of claim 8, wherein the temporary container has a thickness of about 1 to about 1,000 microns.

10. A drag reducing composition comprising:
a sealed temporary container;
a drag reducing agent and up to 20 weight percent of a dispersing fluid disposed in the sealed temporary container; and
a sealed pouch disposed inside the sealed temporary container;
wherein the drag reducing agent comprises polyolefin particles having a particle size of about 10 to about 2,000 microns;
the dispersing fluid comprises water, an alcohol, a hydrocarbon, or a combination comprising at least one of the foregoing;
the temporary container comprises a container material, which includes a polyethylene, a polypropylene, an ethylene propylene copolymer, a polystyrene, a polylactic acid, a polyamide, a polyester, a polystyrene, an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene oxide, a polyethylene glycol, polyvinylidene chloride, a polysaccharide or its derivative, or a combination comprising at least one of the foregoing; and
the weight percent is based on the total weight of the drag reducing composition.

11. The drag reducing composition of claim 1, comprising a plurality of the sealed temporary container, wherein adjacent sealed temporary containers are connected, and the drag reducing agent is disposed in at least one of the plurality of the sealed temporary containers.

12. The drag reducing composition of claim 11, wherein the plurality of the temporary containers form a chain having a length of greater than about 1 meter.

13. The drag reducing composition of claim 1, wherein the polyolefin particles comprise a polyolefin homopolymer, a copolyolefin, a polyolefin copolymer, or a combination comprising at least one of the foregoing, and the polyolefin copolymer comprises first units derived from an olefin component and second units derived from styrene, a vinyl acetate, a vinylalkylene carboxylic ester, or a combination comprising at least one of the foregoing.

14. The drag reducing composition of claim 1, wherein the drag reducing agent is present in an amount of about 80 wt % to about 99.99 wt %, based on the total weight of the drag reducing composition.

15. A fluid comprising the drag reducing composition of claim 1.

16. The fluid of claim 15, wherein the fluid further comprises water, a hydrocarbon, or a combination comprising at least one of the foregoing.

17. A process of manufacturing the drag reducing composition of claim 1, the process comprising:
disposing the drag reducing agent and up to 20 weight percent of the dispersing fluid in the temporary container; and
sealing the temporary container.

18. A method of reducing the flow resistance of a fluid, the method comprising:
disposing the drag reducing composition of claim 1 in the fluid; and
removing the temporary container.

19. The method of claim 18, wherein removing the temporary container comprises dissolving the container material with a polar solvent, a hydrocarbon, or a combination comprising at least one of the foregoing.

20. The method of claim 19, wherein the temporary container is removed in the presence of an acid or base catalyst.

21. A drag reducing composition comprising a plurality of connected but individually sealed temporary containers, at least one of the individually sealed temporary container comprising a drag reducing agent and up to 20 weight percent of a dispersing fluid based on the total weight of the individually sealed temporary container,
wherein the drag reducing agent comprises polyolefin particles having a particle size of about 10 to about 2,000 microns;
the dispersing fluid comprises water, an alcohol, a hydrocarbon, or a combination comprising at least one of the foregoing; and
the individually sealed temporary container comprises a container material, which includes a polyethylene, a polypropylene, an ethylene propylene copolymer, a polystyrene, a polylactic acid, a polyamide, a polyester, a polystyrene, an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene oxide, a polyethylene glycol, polyvinylidene chloride, a polysaccharide or its derivative, or a combination comprising at least one of the foregoing.

22. The composition of claim 21, wherein the plurality of the connected but individually sealed temporary containers form a chain having a length of greater than about 1 meter.

* * * * *